(12) United States Patent
Bai et al.

(10) Patent No.: US 8,731,277 B2
(45) Date of Patent: May 20, 2014

(54) METHODS FOR MATCHING GAIN AND COLOR FOR STEREOSCOPIC IMAGING SYSTEMS

(75) Inventors: Yingjun Bai, San Jose, CA (US);
Honghong Peng, San Jose, CA (US);
Miguel Flores, Hollister, CA (US);
Elizabeth Martin, San Jose, CA (US);
Andrew Hanvey, Reading (GB)

(73) Assignee: Aptina Imaging Corporation, George Town (KY)

( * ) Notice: Subject to any disclaimer, the term of this patent is extended or adjusted under 35 U.S.C. 154(b) by 399 days.

(21) Appl. No.: 13/118,974

(22) Filed: May 31, 2011

(65) Prior Publication Data
US 2012/0189191 A1    Jul. 26, 2012

Related U.S. Application Data

(60) Provisional application No. 61/436,544, filed on Jan. 26, 2011, provisional application No. 61/467,907, filed on Mar. 25, 2011.

(51) Int. Cl.
*G06K 9/00* (2006.01)
*H04N 13/00* (2006.01)

(52) U.S. Cl.
USPC .............................. 382/154; 382/167; 348/42

(58) Field of Classification Search
USPC ........... 348/51, 54, 115, 113, 118, 46, 42, 45, 348/E13.075, E7.085, E7.086; 345/619; 340/435, 905; 382/154, 108, 107, 382/162–167, 168–172, 190, 195, 214, 206, 382/254, 276, 218, 197
See application file for complete search history.

(56) References Cited

U.S. PATENT DOCUMENTS

| | | | |
|---|---|---|---|
| 5,430,474 A * | 7/1995 | Hines | 348/42 |
| 5,818,064 A * | 10/1998 | Kohgami et al. | 250/580 |
| 6,366,691 B1 | 4/2002 | Sogawa | |
| 6,445,814 B2 * | 9/2002 | Iijima et al. | 382/154 |
| 7,176,960 B1 * | 2/2007 | Nayar et al. | 348/207.99 |
| 8,248,457 B2 * | 8/2012 | Goldstein et al. | 348/42 |
| 8,331,654 B2 * | 12/2012 | Abraham et al. | 382/154 |
| 2009/0160931 A1 | 6/2009 | Pockett et al. | |

* cited by examiner

*Primary Examiner* — Sheela Chawan
(74) *Attorney, Agent, or Firm* — Treyz Law Group; Jason Tsai (57) ABSTRACT

Stereoscopic imaging devices may include stereoscopic imagers, stereoscopic displays, and processing circuitry. The processing circuitry may be used to collect auto white balance (AWB) statistics for each image captured by the stereoscopic imager. A stereoscopic imager may include two image modules that may be color calibrated relative to each other or relative to a standard calibrator. AWB statistics may be used by the processing circuitry to determine global, local and spatial offset gain adjustments to provide intensity matched stereoscopic images for display. AWB statistics may be combined by the processing circuitry with color correction offsets determined during color calibration to determine color-transformation matrices for displaying color matched stereoscopic images using the stereoscopic display. Gain and color-transformation corrections may be continuously applied during operation of a stereoscopic imaging device to provide intensity-matched, color-matched stereoscopic images in any lighting condition.

17 Claims, 8 Drawing Sheets

METHODS FOR MATCHING GAIN AND COLOR FOR STEREOSCOPIC IMAGING SYSTEMS

This application claims the benefit of provisional patent application No. 61/436,544, filed Jan. 26, 2011 and provisional patent application No. 61/467,907, filed Mar. 25, 2011, which are hereby incorporated by reference herein in their entireties.

BACKGROUND

This relates to imaging systems and, more particularly, to stereoscopic imaging systems with automatic gain and color matching.

Electronic devices such as portable computers, cameras, mobile phones, handheld gaming devices and other devices are often provided with imaging systems including imaging components and image displays. Imaging components may include an array of image sensors (i.e., sensors that receive incident photons (light) and convert the photons into electrical signals), array control circuitry, and image processing circuitry. Typical image sensor arrays include red, green, and blue image sensors arranged in rows and columns.

Processing circuitry in conventional devices may be used to perform automatic functions such as autofocus, automatic white balance, and automatic color-transformation from an image color space to a display color space before an image is displayed to a user of the device. The processing circuitry collects auto white balance statistics (i.e., average signal values from the red, green, and blue sensors). Auto white balance statistics are often used to determine white balance and color-transformation corrections for image display.

Stereoscopic imaging devices (i.e., electronic devices with more than one imaging module used to simultaneously capture at least partially overlapping images) may also have processing circuitry to perform auto white balance and auto color-transformation corrections. Performing white balance and color-transformation corrections separately to images captured by each imaging module may result in an undesirable mismatch of color and/or intensity of a displayed stereoscopic image.

Intensity and color mismatches may be the result of differences in manufacturing or packaging within specified tolerances (e.g., manufacturing of pixels of differing sensitivity to light, partial masking of an image module by a portion of a device housing, etc.) or may be caused by differences in the color balance of the light source illuminating the field of view of each image module.

It would therefore be desirable to provide improved methods of gain and color correction matching for stereoscopic imaging devices.

DETAILED DESCRIPTION

Stereoscopic imaging devices may be provided with stereoscopic imaging systems having stereoscopic imagers and stereoscopic displays. A stereoscopic imager may include a pair of individual image modules with partially overlapping fields of view that provide image data to image processing circuitry. Stereoscopic images captured with the stereoscopic image module pair may be displayed using a stereoscopic display. The stereoscopic display may display images captured by right and left members of an image module pair simultaneously in such a way as to be viewable only to the right and left eyes, respectively, of a user of the device. Stereoscopic images may be displayed as a continuous viewfinder display or may be captured and displayed later as still or video images.

Stereoscopic imaging devices may be operated in environments illuminated by a variety of illuminants (i.e. light sources) such as sunlight, incandescent light, fluorescent light, and other illuminants. Devices may be used in environments with mixed lighting conditions in which one image module images a real-world scene illuminated by one illuminant while another image module images a scene illuminated by a different illuminant. A left image module may, for example, image a portion of real-world scene that is substantially indoors and illuminated by fluorescent light bulbs while the right image module may image a portion of the same real-world scene that includes a window. The portion of the scene that includes the window may include objects lit by sunlight or a combination of sunlight and fluorescent light. Each illuminant is associated with a unique color temperature and illuminates a scene with a unique combination of colors.

In order to display stereoscopic images with a stereoscopic display that are comfortably viewed and aesthetically pleasing to a user of the device, the color and intensity in the left and right images can be matched. This is particularly challenging as left and right members of an image module pair may have physical differences (within required manufacturing and packaging tolerances) and may also be exposed to different portions of a real-world scene due to the physical separation of the image modules as mounted in a stereoscopic imaging device.

Figure 1:
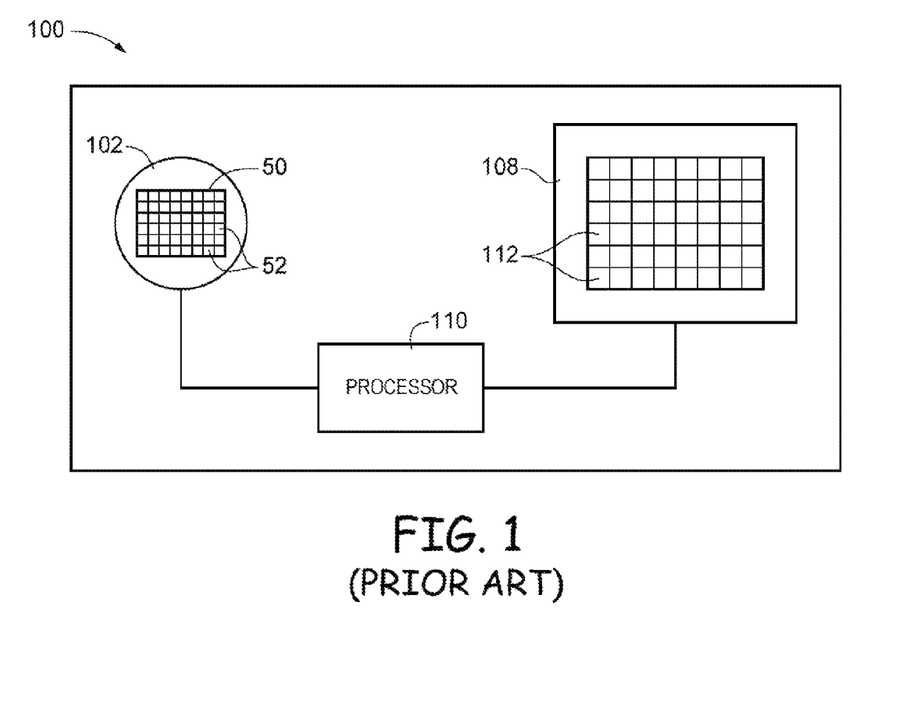
FIG. 1 is a diagram of a conventional electronic device having a single imaging component.

A conventional imaging device with a single imaging component is shown in FIG. 1. Device 100 includes single imaging component 102 containing imaging array 50. Imaging array 50 includes image pixels 52 and is coupled to processor 110. Processor 110 is used to perform auto white balance and color-transformation operations on images captured with image component 102. Processed images are then output to display 108 using display elements 112.

Figure 2:
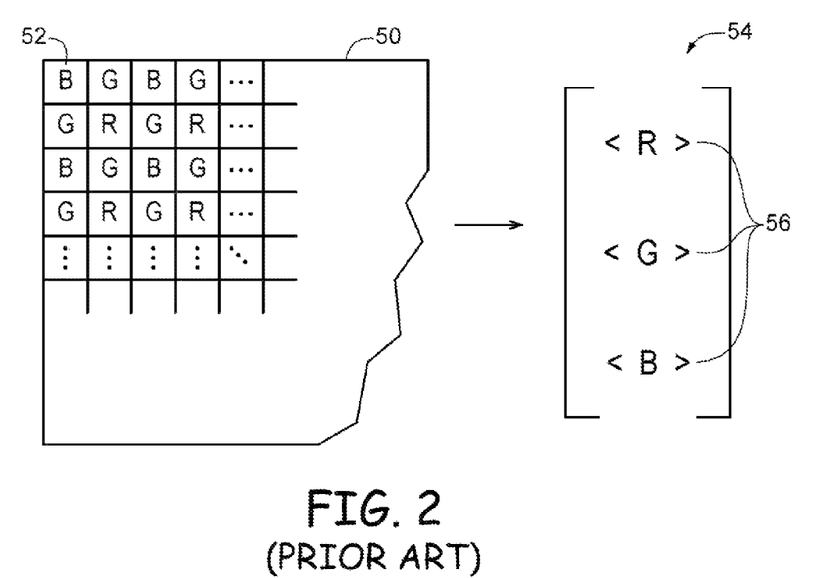
FIG. 2 is a diagram of a standard Bayer color pixel distribution and a collection of auto white balance statistics in a conventional device having a single imaging component.

Conventional imaging device 100 with single image component 102 uses an automatic white balance (AWB) procedure to compensate for varying quantities of color of a scene illuminating light source. The AWB procedure includes gathering a collection of white balance statistics as shown in FIG. 2. FIG. 2 shows a detailed view of imaging array 50. As shown in FIG. 2, image pixels 52 are either sensitive to red (R), green (G), or blue (B) light. The average of intensity values measured by image pixels 52 of a given color may be computed to form AWB vector 54 of AWB statistics (or stats) 56. Stats 56 represent average pixel intensity values of all red <R>, green <G> and blue <B> pixels, respectively.

Figure 3:
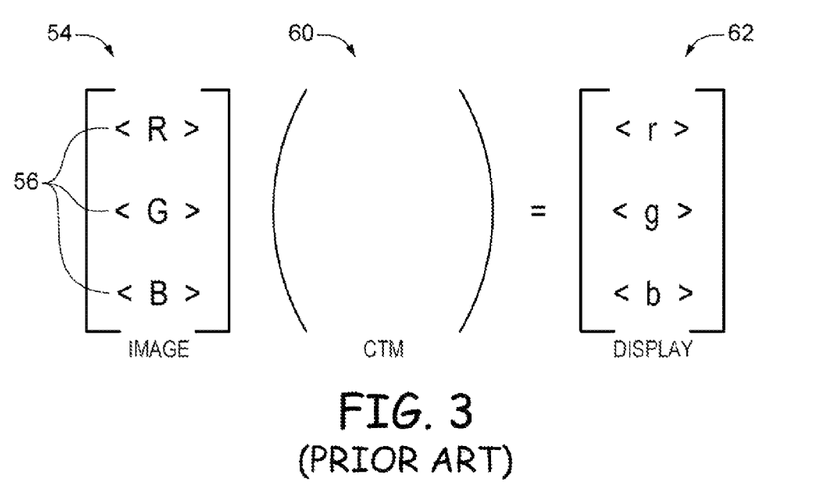
FIG. 3 shows a conventional method for computing display color values based on image color values and a color-transformation matrix for a device with a single imaging component.

Display 108 may be able to display colors using display elements 112 having associated colors red (r), green (g) and blue (b). The color space (i.e., the range of available colors) defined by display element colors r, g, and b may be different from the color space R, G, and B of the imaged real-world scene. In a typical device, processor 100 is used to estimate a color temperature CT of the illuminant from AWB stats 56. Typically, the color temperature is determined using a ratio of two AWB stats and a predetermined mapping function that maps a measured AWB stat ratio to a color temperature CT. FIG. 3 shows color-transformation matrix (CTM) 60 which is determined based on the color temperature of the illuminant. Each color temperature CT is typically associated with a respective color-transformation matrix 60. CTM 60 is used to transform the range of colors represented by image AWB vector 54 to a color space represented by display vector 62 (see, e.g., FIG. 3).

Auto white balance and color-transformation corrections typical of conventional devices with a single imager are inadequate for matching the color and intensity of a stereoscopic imaging pair.

Figure 4:
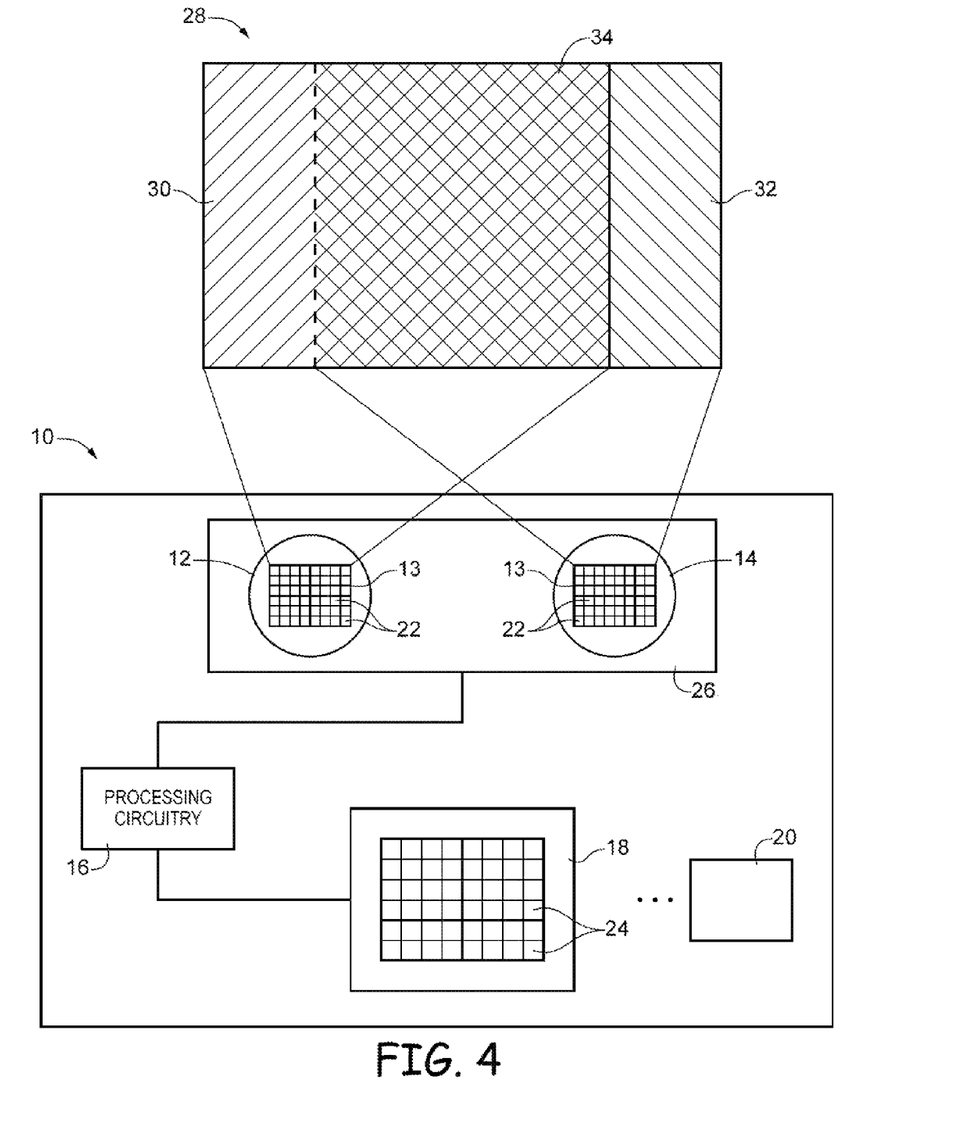
FIG. 4 is a diagram of an illustrative electronic device that may include a stereoscopic pair of image modules having a partially overlapping field of view for capturing stereoscopic images in accordance with an embodiment of the present invention.

An illustrative electronic device having a stereoscopic imaging system including a stereoscopic imager and stereoscopic display is shown in FIG. 4 in accordance with an embodiment of the present invention. Electronic device 10 may be a digital camera, a computer, a cellular telephone, a medical device, gaming system or other electronic device. Electronic device 10 may include stereoscopic imager 26 having a first image module M1 and a second image module M2 that operate as a stereoscopic image module pair. Image modules M1 and M2 may be arranged such that module M1 corresponds to left image module 12, whereas module M2 corresponds to right image module 14. Device 10 may also include one or more lenses, image processing circuitry such as image processing circuitry 16, and other components such as component 20. Component 20 may be computing circuitry for running software, a communications component, or other components. As shown in FIG. 4, image modules 12 and 14 may each include an image array 13 of photosensitive elements 22 (i.e., pixels) that convert light into digital data corresponding to the intensity of the light. Image arrays 13 may have any number of pixels (e.g., hundreds, thousands, millions, or more). A typical image sensor may, for example, have millions of pixels (e.g., megapixels). Pixels 22 may be sensitive to red, green, or blue light. Device 10 may include a stereoscopic display 18 for display of stereoscopic images. Stereoscopic display 18 may include individual display elements 24.

Stereoscopic imager 26 may have a total field of view such as field of view 28 formed by partially overlapping fields of view of left and right image modules 12 and 14. In the example of FIG. 4, field of view 28 has a left portion 30 visible only to left image module 12, a right portion 32 visible only to image module 14, and a common overlapping portion 34 visible to both left module 12 and right module 14.

Pixels 22 may be manufactured with a varying degree of sensitivity to light (i.e., one pixel may produce a larger signal than another pixel when exposed to the same intensity of light). Pixels 22 may vary in sensitivity within a single image module and between image modules 12 and 14. Packaging variations may also exist between image modules 12 and 14 (e.g., the placement of the imaging array within an opening in the device housing may vary from image module to image module). Due to variations in pixel sensitivity and module packaging, an image intensity disparity may exist between images captured by image modules 12 and 14 even in overlapping portion 34 of field of view 28.

The image intensity disparity may be characterized as a total relative gain ratio G(x,y) of each pixel (x,y) of first image module M1 to an associated overlapping pixel of second image module M2. Gain ratio G(x,y) may be modeled as a combination of a whole image relative gain ($G_{GLOBAL}$) and a spatially varying relative gain ($G_{LOCAL}(x,y)$) for each pixel (x,y), i.e.:

$$G(x,y)=G_{GLOBAL}*G_{LOCAL}(x,y) \quad (1)$$

Image gain $G_{GLOBAL}$ may be due to an illuminant dependent pixel response discrepancy. The spatially varying gain $G_{LOCAL}(x,y)$ may be due to packaging differences, such as a lens mounting offset, for example. For each pixel and each image module, the magnitude of each of the two types of gain disparity $G_{GLOBAL}$ and $G_{LOCAL}$ may be different from one another or may be substantially the same.

Global gain ratio $G_{GLOBAL}$ may be computed for all pixels 22 of each color (red, green, and blue) by computing the ratio of the average intensities of all pixels 22 of each module in overlapping region 34 at that color. For example, global gain ratio $G_{GLOBAL, R}$ of the red pixels in modules M1 and M2 is computed as the ratio of the average value $<R_{M1}>$ of the red pixels of module M1 and the average value $<R_{M2}>$ of the red pixels of module M2 in overlapping region 34:

$$G_{GLOBAL,R}=<R_{M1}>/<R_{M2}> \quad (2)$$

Global gain ratios for green and blue pixels ($G_{GLOBAL, G}$ and $G_{GLOBAL, B}$) may be computed using equation (2) as applied to all green and blue pixels in overlapping region 34 respectively.

Figure 5:
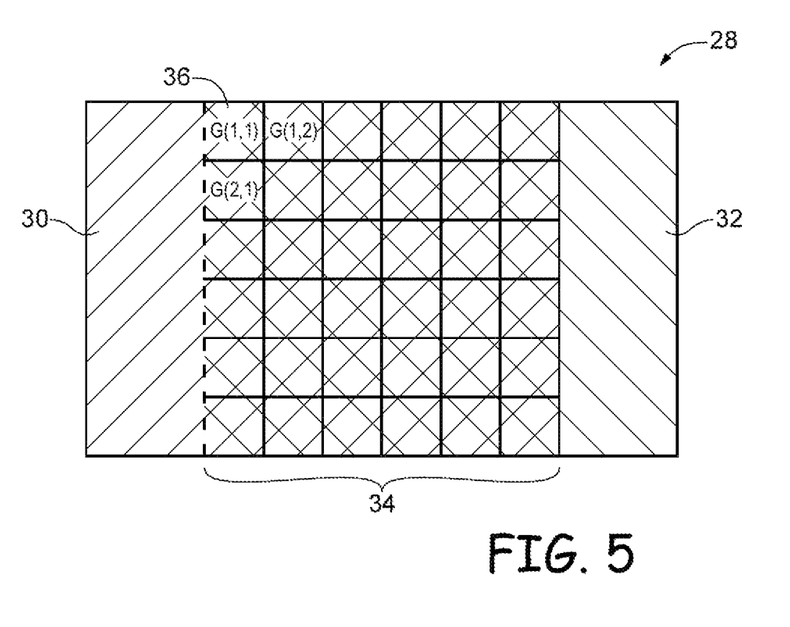
FIG. 5 is a diagram showing how the overlapping field of view of FIG. 4 may be organized into zones for computing local gain disparities in accordance with an embodiment of the current invention.

FIG. 5 is a diagram of an illustrative division of overlapping region 34 of partially overlapping field of view 28 into zones 36 for determination of local gain ratios ($G_{LOCAL}$) in accordance with an embodiment of the present invention. Zones 36 may include a plurality of pixels of each color (a 10 pixel by 10 pixel sub-array, for example). A gain ratio for each color for each zone 36 may be computed using equation (2) by averaging all pixels of each color in a given zone for each module. In the example of FIG. 5, resulting zone gains G(p,q) for zones labeled (p,q) may be used to assign a local gain ratio $G_{LOCAL}(x,y)$ to each pixel labeled (x,y). $G_{LOCAL}(x,y)$ may be set to be equal to zone gain G(p,q) for all pixels (x,y) in zone (p,q) or may be determined in another suitable manner.

In one illustrative implementation, a single gain map may be stored in which a gain ratio for each pixel (x,y) is initially set to the zone gain G(p,q) corresponding to the zone (p,q) which contains pixel (x,y). To avoid sharp edges in the gain map at the border of one zone (p,q) with another zone (p',q'), the gain map may be smoothed to produce a smoothed gain map using one or more low-pass filters. In a low-pass filtering process, the value of the gain ratio for a pixel (x,y) is replaced with a combination of the values of the gain ratios of some number of surrounding pixels. The combination of the values of the gain ratios of the surrounding pixels may be the median of those pixel values or another suitable linear combination of those pixel values. The smoothed gain map includes a local gain $G_{LOCAL}(x,y)$ for each pixel (x,y). $G_{LOCAL}(x,y)$ may then be combined with $G_{GLOBAL}$ using equation (1) to determine a total gain ratio G(x,y) for each pixel of each color.

A gain-matched stereoscopic image may be produced using processing circuitry 18 by adjusting the intensity values of all pixels of the module (M1 or M2) with the higher mean intensity values down by a factor G(x,y) (i.e., by dividing the intensity value of each pixel (x,y) by the gain factor G(x,y) corresponding to that pixel). Alternatively, all pixels of the module (M1 or M2) with the lower mean intensity values may be adjusted higher by a factor of G(x,y). In a third alternative, pixel values of modules M1 and M2 may both be adjusted toward a central value by factors smaller than G(x,y). Following production of the gain-matched stereoscopic image, the gain-matched image may be displayed with stereoscopic display 18.

Figure 6:
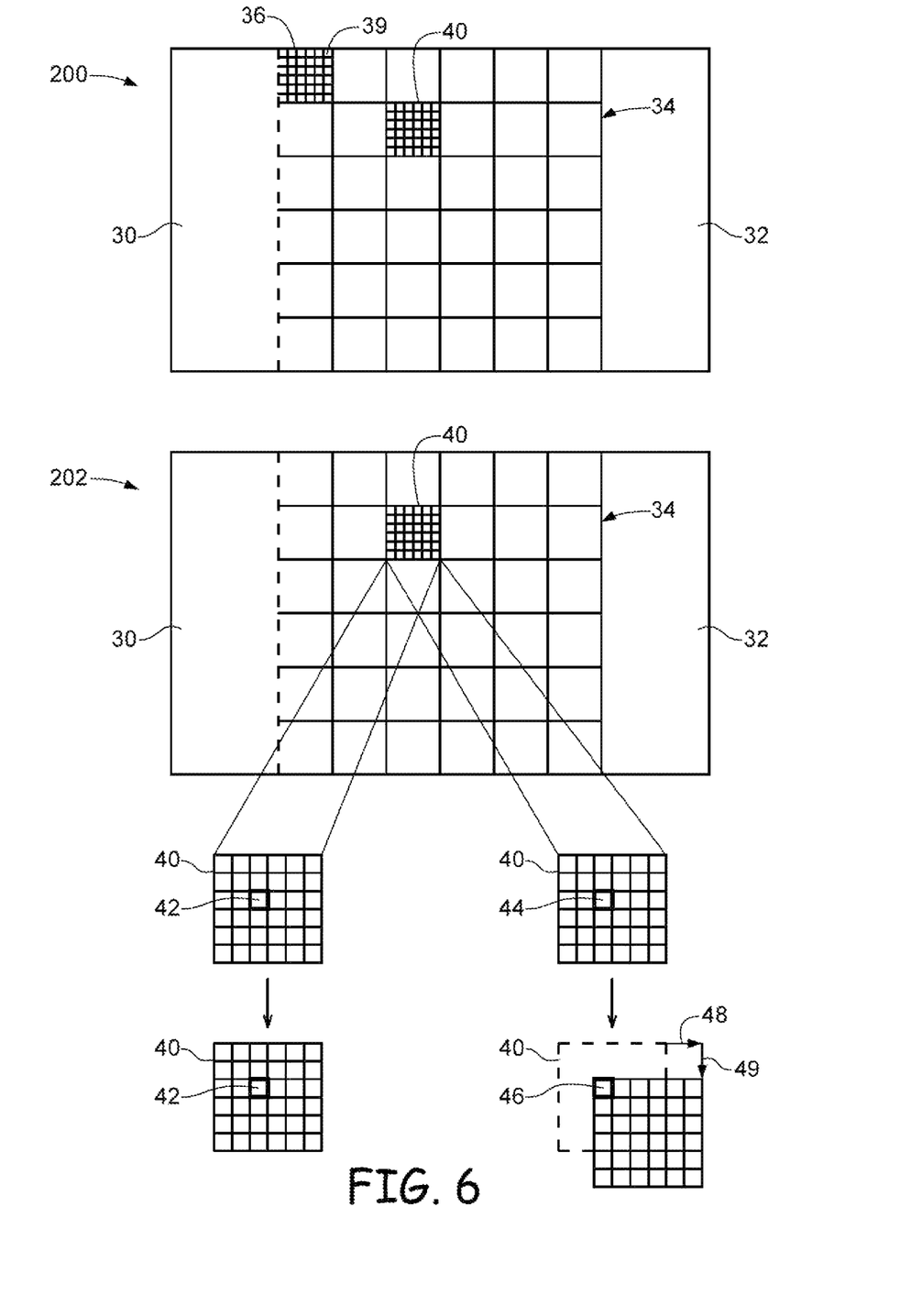
FIG. 6 is diagram of an illustrative process for determining a relative pixel offset between images generated using a pair of image modules in accordance with an embodiment of the current invention.

FIG. 6 is a diagram illustrating a method for an optional further correction of local gain values $G_{LOCAL}(x,y)$ due to a misalignment of the pixels of image modules M1 and M2 in accordance with another embodiment of the present invention. In illustrative stereoscopic imaging device 10, a given image pixel 22 of image module M1 is expected to overlap with a predicted pixel of image module M2. Due to packaging and manufacturing differences, a given pixel of module M1 may be spatially offset from the predicted overlapping pixel of module M2. This offset may have undesirable consequences as the local gain corrections described in connection with FIG. 5 depend on the assumption that the fields of view of pixels in overlapping zones are the same. For this reason, it is desirable to determine an image offset relative gain that may be applied as part of the overall relative gain adjustment.

As shown in FIG. 6, a first stereoscopic image such as image 200 is obtained using image modules M1 and M2. Image 200 may, if desired, be a gain-matched stereoscopic image as described in connection with FIG. 5. As in the procedure described in connection with FIG. 5, the portion of image 200 corresponding to overlapping portion 34 of field of view 28 of stereoscopic imager 26 is divided into zones such as zone 36. Each zone 36 is imaged by a plurality of pixels such as pixel 39. A zone such as zone 40 with the highest focus value FV in an autofocus operation is identified in each image. Focus value FV may depend on the distance of objects in a real-world scene from device 10 and may be characterized by a sharpness value determined in connection with the autofocus operation.

In a subsequent stereoscopic image frame such as frame 202, pixels 36 within high FV zone 40 are used to perform a sum-of-absolute-differences misalignment calculation. Image 202 may, if desired, be a gain-matched stereoscopic image as described in connection with FIG. 5. In a sum-of-absolute-differences misalignment calculation, it is assumed that each pixel 42 of first image module M1 in overlapping portion 34 overlaps a corresponding pixel 44 of second image module M2 (i.e., pixels 42 and 44 view the same portion of a real-world scene). Due to small differences in packaging and manufacturing modules M1 and M2 of device 10, pixel 44 of module M2 may overlap a pixel other than pixel 42 of image module M1. Given the assumption that pixel 42 and pixel 44 overlap, the difference in the intensity values of pixels 42 and 44 should be smaller than the difference between the intensity values of pixel 42 and pixels other than pixel 44 of module M2. Absolute pixel-difference value $D_{44,42}$ may be computed by subtracting intensity value $I_{44}$ of pixel 44 from intensity value $I_{42}$ of pixel 42 and taking the absolute value of that difference (i.e., $D_{44,42}=|I_{44}-I_{42}|$). This may be repeated for all overlapping pixels of modules M1 and M2 in high FV region 40. The sum of all absolute pixel-difference values $SUM_0(D_{i,j})$ for all pixels (i,j) in zone 40 may then be computed.

Sum-of-absolute-difference values $SUM(D_{i,j})$ may then be computed for other test scenarios (labeled p) in which it is assumed that a pixel other than pixel 44 of image module M2 overlaps pixel 42 of image module M1. Test scenarios, p, may include test scenarios for a previously determined number of module M2 pixels (e.g. all pixels within 20 pixels vertically and within 20 pixels horizontally of pixel 44). For each test scenario, p, a sum-of-absolute-differences $SUM_p(D_{i,j})$ is recorded. The scenario, p, that results in the smallest sum-of-absolute-differences is chosen to be the correct scenario (labeled P). In correct scenario, P, a pixel other than pixel 44 such as pixel 46 may be determined to be the overlapping pixel of pixel 42 of image module M1. In the illustrative example of FIG. 6, identification of pixel 46 of module M2 with corresponding pixel 42 of module M1 results in an offset correction between image modules M1 and M2 including horizontal offset 48 and vertical offset 49. Horizontal offset 48 and vertical offset 49 may be integer numbers of pixels or any other value.

The sum-of-absolute-differences $SUM_P(D_{i,j})$ in scenario P may be divided by the sum-of-absolute-differences $SUM_0(D_{i,j})$ in the scenario in which originally assumed pixel 44 is assumed to overlap pixel 42 to provide a spatial offset relative gain $G_{OFFSET}$ (i.e., $G_{OFFSET}=SUM_P(D_{i,j})/SUM_0(D_{i,j})$) that may be applied to all pixels 39 of zone 40. Given offsets 48 and 49, a similar spatial offset gain correction $G_{OFFSET}$ may be computed for each zone 36. Spatial offset relative gain values for all pixels 39 in overlapping portion 34 may be stored as a spatial offset gain map. The values of the spatial offset gain map at each pixel (x,y) may be set to be equal to the offset gain $G_{OFFSET}$ for all pixels (x,y) in zone 36 in which pixel (x,y) is located or may be determined in another suitable manner.

In one illustrative implementation, an offset gain map may be stored in which an offset relative gain $G_{OFFSET}(x,y)$ for each pixel (x,y) is initially set to the offset relative gain $G_{OFFSET}$ corresponding to the zone 36 which contains pixel (x,y). To avoid sharp edges in the offset gain map at the border of one zone with another zone, the gain map may be smoothed using one or more low-pass filters. The smoothed offset gain map includes a correction factor $G_{OFFSET}(x,y)$ to the local gain $G_{LOCAL}(x,y)$ for each pixel (x,y) (e.g. $G'_{LOCAL}(x,y)=G_{LOCAL}(x,y)*G_{OFFSET}(x,y)$). Corrected local gain $G'_{LOCAL}(x,y)$ may then be combined with $G_{GLOBAL}$ using equation (1) to determine a total gain ratio G(x,y) for each pixel of each color.

As described in connection with FIG. 5, a gain-matched stereoscopic image may be produced using a total gain adjustment applied to first frame 200 using a total gain G(x,y) that does not include spatial offset relative gain $G_{OFFSET}$. First frame 200 may be displayed using stereoscopic display 18 while offset gain $G_{OFFSET}$ is being determined. Subsequent frames such as second frame 202 may have a total gain matching adjustment that includes a spatial offset gain applied by adjusting the intensity values of all pixels of the module (M1 or M2) with the higher mean intensity values down by a factor G(x,y). The adjustment may alternatively be made to adjust all pixels of the module (M1 or M2) with the lower mean intensity values higher by a factor of G(x,y). In a third alternative, pixel values of modules M1 and M2 may both be adjusted toward a central value by factors smaller than G(x,y). Following total gain adjustment, gain-matched stereoscopic images such as second frame 202 may be displayed with stereoscopic display 18.

Figure 7:
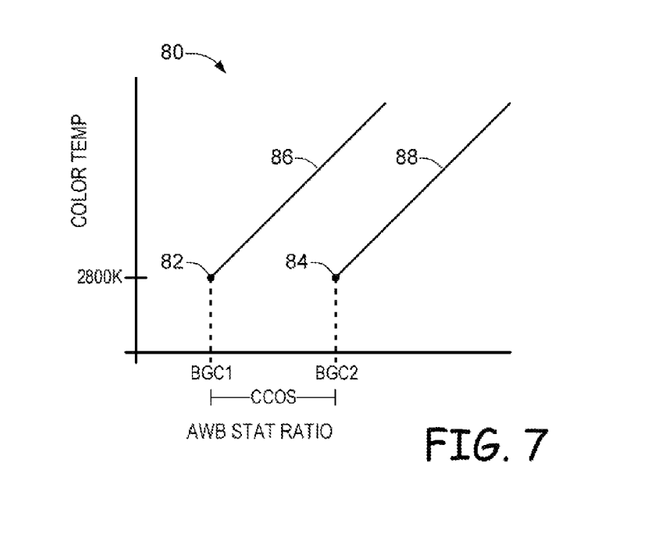
FIG. 7 is a graph showing color temperature versus automatic white balance statistics ratio in accordance with an embodiment of the present invention.

FIG. 7 is a graph depicting illustrative results of a calibration method for stereoscopic imaging devices with stereoscopic displays that may provide color-matched stereoscopic images for stereoscopic display of images captured in environments with single or mixed illuminants in accordance with an embodiment of the present invention. Graph 80 of FIG. 7 shows the mapping of a ratio of a chosen auto white balance statistic for each image module M1 and M2 to a color temperature of an illuminating light source using a mapping function such as mapping function 86. In the example of FIG. 7, the ratio of chosen AWB statistics may be, for example, a ratio of blue-to-green pixel averages for image module M1 (i.e., $BG1=<B_{M1}>/<G_{M1}>$) and image module M2 (i.e., $BG2=<B_{M2}>/<G_{M2}>$).

In the calibration described by graph 80, two blue-to-green calibration ratios BGC1 and BGC2 are measured using image module M1 and image module M2, respectively. Measured blue-to-green calibration ratios BGC1 and BGC2 may be measured once at the time of production and assembly of the device using a calibration apparatus to expose both image modules M1 and M2 to the same real-world scene under the same illuminant. In one preferred implementation, the real-world scene may be a grey card and the illuminant may have a color temperature, as indicated in FIG. 7, of 2800K. The calibration step illustrated in FIG. 7 allows a determination of calibration points 82 and 84 for image modules M1 and M2 respectively, at a known color temperature of, e.g., 2800K. The difference between blue-to-green calibration ratios BGC1 and BGC2 determines a color calibration offset CCOS. Color calibration offset CCOS may be used to translate predetermined mapping function 86, anchored to calibration point 82 of image module M1 into a second mapping function 88 anchored to calibration point 84 of image module 2.

Figure 8:
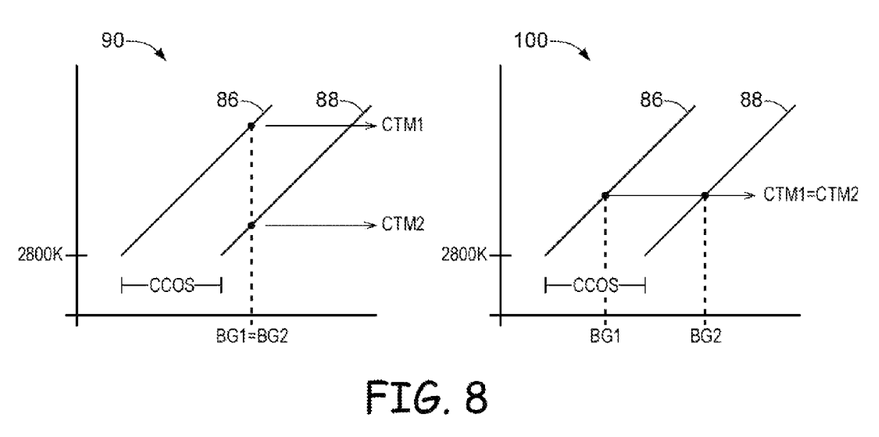
FIG. 8 includes two graphs of the type shown in connection with FIG. 7 to illustrate a running color-transformation matching scheme in accordance with an embodiment of the current invention.

FIG. 8 includes two graphs illustrative of a running color-transformation matching method for stereoscopic imaging devices with stereoscopic displays that have undergone the calibration step described in connection with FIG. 8 in accordance with an embodiment of the present invention. In graph 90 of FIG. 8, mapping function 86, determined in the calibration process described in connection with FIG. 7 maps a blue-to-green gain ratio measured by image module M1 into a color temperature of an illuminating light source. The color temperature of the illuminating light source is used to determination a color-transformation matrix CTM1 for transforming the color space of an image capture with image module M1 to the display color space of stereoscopic display 18. Graph 90 also shows mapping function 88 (determined in a calibration step as described in connection with FIG. 8) which maps blue-to-green gain ratios measured by image module M2 into a color temperature for determination of color-transformation matrix CTM2.

During normal user operation of a calibrated device 10, the imager may be used to image a scene with a mixed illuminant such that image module M1 is exposed to a different combination of illuminants than image module M2. In the case in which two different illuminants are viewed, two different color-transformation matrices should be used. In the example of graph 90 of FIG. 8, although image module M1 sees a different illuminant than image module M2, due to manufacturing and packaging disparities, both image module M1 and image module M2 may measure the same blue-to-green gain ratio (i.e., BG1=BG2). As shown in graph 90 of FIG. 8, however, BG1 and BG2 are correctly mapped to two different color-transformation matrices CTM1 and CTM2. Following transformation of the image color space of the images captured by image modules M1 and M2 to the display color space of stereoscopic display 18 using color-transformation matrices CTM1 and CTM2, a color-matched image may be displayed on stereoscopic display 18.

In graph 100 of FIG. 8, an illustrative color calibration correction is described for a scenario in which a user images a scene with a single illuminant. In a scenario in which a scene illuminated by a single illuminant is imaged with both modules M1 and M2, a desirable color matching solution should result in a single color-transformation matrix for both image modules M1 and M2. In graph 100 of FIG. 8, blue-to-green ratio BG1 of image module M1 is different than blue-to-green ratio BG2 of image module M2. However, mapping functions 86 and 88, respectively, map blue-to-green ratios BG1 and BG2 to the same color correction matrix (i.e. CTM1=CTM2). Once determined, the image color space of the images captured by image modules M1 and M2 may be transformed to the display color space of stereoscopic display 18 using color-transformation matrix CTM1 (which is equal to CTM2). Following color-transformation, a color-matched image may be displayed on stereoscopic display 18.

Figure 9:
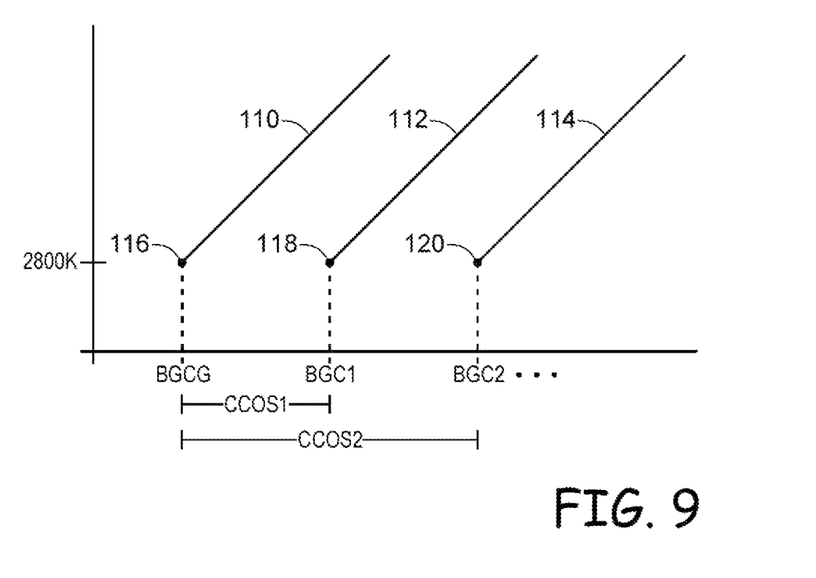
FIG. 9 is a graph illustrating how multiple imaging devices may be calibrated to a same golden standard in accordance with an embodiment of the present invention.

FIG. 9 is a graph describing another embodiment of the current invention which includes a calibration of two image modules of a stereoscopic imaging device relative to the calibration of a standard (sometimes called "gold standard") image module (MG). As described with respect to FIG. 7, the example of FIG. 9 shows blue-to-green calibration ratios BGC1 and BGC2 for image modules M1 and M2, respectively, determined using a grey card as the real-world scene and an illuminant with a color temperature of 2800K. In the embodiment of FIG. 9, a third blue-to-green calibration ratio (BGCG) is determined for the gold standard image module MG. Individual color calibration offsets CCOS1 and CCOS2 may then be determined for image modules M1 and M2 with respect to gold standard image module MG. A gold standard mapping function such as gold standard mapping function 110 that is anchored to gold standard calibration point 116 may be stored on device 10. Color calibration offsets CCOS1 and CCOS2 may also be stored on device 10 and may be used to translate mapping function 110 to mapping functions 112 and 114 anchored to calibration points 118 and 120 for image modules M1 and M2 respectively. Calibration with respect to gold standard module MG may be performed for modules M1 and M2 of all devices 10 at the time of manufacturing. Calibrating both image modules of all stereoscopic imaging devices to a gold standard may allow display of color-matched stereoscopic images of a single real-world scene on all devices.

Combining the color calibration methods described with respect to FIGS. 7-9 with the gain matching methods described with respect to FIGS. 4-6 may allow gain-matched, color-match stereoscopic images to be produced by stereoscopic imagers and displayed on stereoscopic displays.

Figure 10:
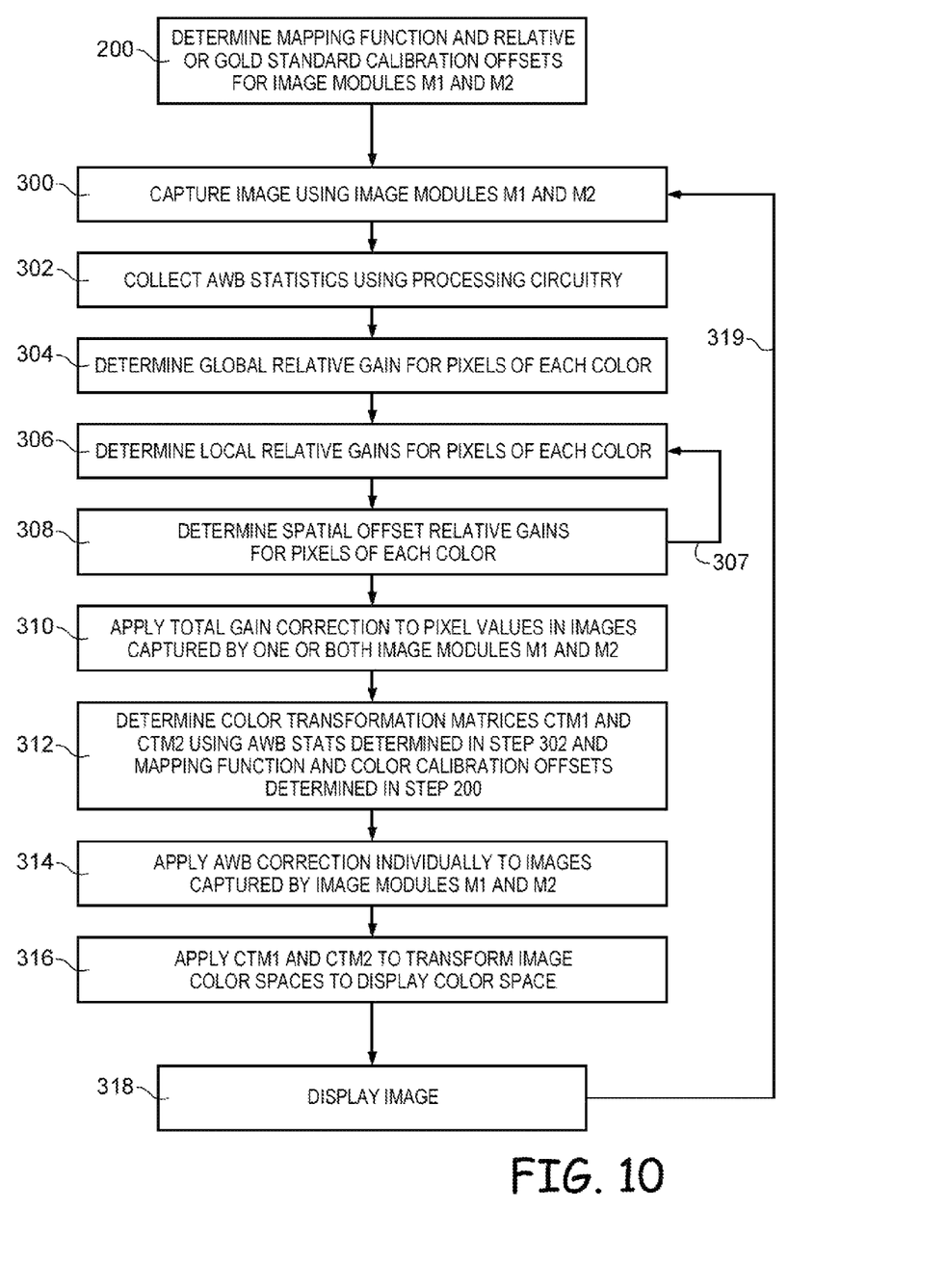
FIG. 10 is a flowchart of illustrative steps for producing gain-matched, color-transformation-matched stereoscopic images for stereoscopic display in accordance with an embodiment of the current invention.

FIG. 10 is a flowchart describing an illustrative method for providing gain-matched, color-matched stereoscopic images for a stereoscopic imaging device having a stereoscopic imager and stereoscopic display. As shown in FIG. 10, step 200 is a calibration step performed once at the time of production of device 10. At step 200, left image module 12 and right image module 14 of stereoscopic imager 26 may be calibrated by exposing modules 12 and 14 to a grey card illuminated by a known illuminant with a known color temperature of, e.g., 2800K. This calibration step results in a color calibration offset CCOS used to translate a mapping function such as mapping function 86 of FIG. 8 for first image module M1 to a mapping function such as mapping function 88 for second image module M2. Mapping function 86 and color calibration offset CCOS may be used in later steps for displaying color-matched stereoscopic images.

In another embodiment, at step 200, left image module 12 and right image module 14 of stereoscopic imager 26 may be calibrated by exposing modules 12 and 14 and a gold standard image module MG to a grey card illuminated by an illuminant with a known color temperature of, e.g., 2800K. This calibration step results in individual color calibration offsets CCOS1 and CCOS2 for image modules M1 and M2 respectively. Color calibration offsets CCOS1 and CCOS2 may be used to translate a gold standard mapping function such as gold standard mapping function 110 of FIG. 9 for gold standard image module MG into mapping functions such as mapping functions 112 and 114 of image modules M1 and M2 respectively. Mapping function 110 and color calibration offsets CCOS1 and CCOS2 may be used in later steps for displaying stereoscopic images that are color-matched to a gold standard.

Steps 300, 302, 304, 306, 307, 308, 310, 312, 314, 316, 318, and 319 describe a gain and color-transformation matching loop that may operate continuously during operation of a stereoscopic imaging device such as device 10 using processing circuitry 16 to provide adaptive gain and color matching responsive to changing illuminants and changing real-world scenes. At step 300, image modules M1 and M2 simultaneously capture an image. At step 302 auto white balance (AWB) statistics (e.g., mean intensities values for pixels of each color) are collected and stored using processing circuitry such as processing circuitry 16. At step 304, global relative gain $G_{GLOBAL}$ is determined from the mean pixel values in the overlapping region of the image capture by each image module. At step 306, local relative gain $G_{LOCAL}$ is determined from the mean pixel values in zones such as zones 36 of FIG. 5 in the overlapping region of the image capture by each image module. At step 308, a spatial offset relative gain $G_{OFFSET}$ is determined in a high focus value zone such as high FV zone 40 of FIG. 6. As indicated by line 307 of FIG. 10, spatial offset gain $G_{OFFSET}$ may be determined using a first image and applied to a the local relative gain $G_{LOCAL}$ is of the next image.

At step 310, a total relative gain correction G(x,y) is applied to the value of each pixel (x,y) in the image of one or both of image modules M1 and M2. The total relative gain correction G(x,y) may be a multiplication of global relative gain $G_{GLOBAL}$ and local relative gain $G_{LOCAL}$ as described by equation (1). The total gain correction may be applied by adjusting the intensity values of all pixels of the module (M1 or M2) with higher mean intensity values down by a factor G(x,y) (i.e., dividing the intensity value of each pixel (x,y) by the gain factor (G(x,y) corresponding to that pixel). The total gain correction may alternatively be made to adjust all pixels of the module (M1 or M2) with the lower mean intensity values higher by a factor of G(x,y). In a third alternative, pixel values of modules M1 and M2 may both be adjusted toward a central value by factors smaller than G(x,y).

At step 312, AWB statistics collected in step 302 may be combined with mapping function 86 and color calibration offset CCOS determined in calibration step 200 to determine color-transformation matrices CTM1 and CTM2. If, in step 200, color calibration offsets CCOS1 and CCOS2 were determined relative to a gold standard image module MG, color-transformation matrices CTM1 and CTM2 may be determined using AWB statistics collected in step 302, a predetermined gold standard mapping function and color calibration offsets CCOS1 and CCOS2. At step 314, an auto white balance correction is applied to the image captured by each image module M1 and M2 individually. Auto white balance correction may include a relative scaling of the pixels of one color by the ratio of the means of the pixels of that color and another color.

At step 316, processing circuitry 16 may be used to apply color-transformation matrices CTM1 and CTM2 to the color spaces of the images captured by image modules M1 and M2 respectively to transform the image color space to the color space of stereoscopic display 18. CTM1 and CTM2 may be substantially the same or may be different. At step 318, a gain-matched, color-matched stereoscopic image may be displayed with display 318. As indicated by line 319 of FIG. 10, the method described in steps 300-318 may be applied continuously to a series of images captured in succession by device 10. The gain-matched, color-matched stereoscopic images produced in steps 300-316 may be continuously displayed on stereoscopic display 18 as in the case of a continuous viewfinder display or may be stored and displayed later as individual images or as a continuous loop as in the case of video playback.

Various embodiments have been described illustrating methods which may be provided for gain and color-transformation matching for stereoscopic imaging devices with stereoscopic imagers and stereoscopic displays. Images may be captured using left and right image modules of a stereoscopic imager. Using processing circuitry associated with the device, auto white balance statistics may be collected from the image captured by each image module and used for relative gain correction, image color space determination and for determining the color temperature of an illuminating light source. Relative gain matching may be performed by determining both an illuminant dependent global relative gain and an illuminant independent local relative gain. The global relative gain may be determined using pixel values for all pixels of each imager in an overlapping portion of the fields of view of the imager modules. The local relative gain may be determined using the pixels in overlapping zones that are portions of the overlapping portion of the fields of view of the image modules.

A total relative gain may be determined from the global and local relative gains. A total gain matching adjustment may be applied to the images of one image module by dividing the pixel intensity values by the determined total relative gain. Alternative embodiments allow for a total gain matching adjustment applied by reducing the pixels values of the image module having higher mean intensities, by increasing the pixel values of the module having lower mean intensities or by a suitable combination of the two.

Correction of the determined local gains for a bias due to spatial offset of the image pixel arrays of the two image modules (e.g., from an assumed nominal offset) may be determined using a sum-of-absolute-differences procedure in a high focus zone of the overlapping portion of the fields of view of the image modules.

Color-transformation from an image color space to a display color space may be performed using color-transformation matrices determined based on a stored mapping function that maps a selected auto white balance statistic to a color temperature of an illuminating light source. Color-transformation matching may be achieved by performing a color calibration in which both left and right image modules are exposed to a grey card under the same illuminant. The color calibration may result in a color calibration offset between the first and second image modules. Color matched images may be produced by determining color-transformation matrices for each image module using both the stored mapping function and the determined color calibration offset between the left and right image modules.

In another embodiment, color-transformation matching may be achieved by determining color calibration offsets between the left and right image modules and a gold standard image module. Calibrating left and right image modules of multiple stereoscopic image devices to a gold standard image module may allow color-matched stereoscopic display of stereoscopic images on multiple stereoscopic imaging devices. Gain (intensity) and color matched images may be provided by combining some gain and color matching methods and may be displayed on the stereoscopic display of the device. Intensity and color matching processes may be applied on a continuous basis during operation of the device and may produce gain and color matched images for continuous display. Images may also be stored and displayed later as single images or as running video playback.

The foregoing is merely illustrative of the principles of this invention which can be practiced in other embodiments.

What is claimed is:

1. A method of producing gain-matched stereoscopic images using a stereoscopic imaging device wherein the stereoscopic imaging device comprises a stereoscopic display, processing circuitry and a stereoscopic imager having a first image module and a second image module, the method comprising:
   capturing a first image with the first image module and a second image with the second image module, wherein the first image and the second image have a common overlapping portion;
   with the processing circuitry, determining a global gain ratio between the first and second images using the common overlapping portion of the first and second images;
   with the processing circuitry, determining a local gain ratio using at least one zone in the common overlapping portion of the first and second images; and
   with the processing circuitry, determining a total gain ratio by combining the global gain ratio and the local gain ratio.

2. The method defined in claim 1, wherein the first image has a mean intensity, the method further comprising:
   with the processing circuitry, adjusting the mean intensity by multiplying the mean intensity by the total gain ratio.

3. The method defined in claim 1, wherein the first image has a mean intensity, the method further comprising:
   with the processing circuitry, adjusting the mean intensity by dividing the mean intensity by the total gain ratio.

4. The method defined in claim 1, wherein determining the total gain ratio comprises multiplying the global gain ratio by the local gain ratio.

5. The method of claim 1, further comprising:
   with the processing circuitry, determining a spatial offset correction to the local gain ratio using a sum-of-absolute-differences procedure.

6. A method of producing gain-matched, color-matched stereoscopic images using a stereoscopic imaging device wherein the stereoscopic imaging device comprises a stereoscopic display, processing circuitry, and a stereoscopic imager having a first image module and a second image module, the method comprising:
   with a calibration apparatus, generating a color-calibration offset between the first image module and the second image module;
   capturing a first image with the first image module and a second image with the second image module, wherein the first image and the second image have a common overlapping portion, and wherein the first image has a first mean intensity and the second image has a second mean intensity;
   with the processing circuitry, determining a global gain ratio and a local gain ratio between the first and second images;
   with the processing circuitry, determining a total gain ratio between the first and second images by combining the global gain ratio and the local gain ratio; and
   adjusting the first mean intensity based on the total gain ratio.

7. The method defined in claim 6, further comprising:
   with the processing circuitry, determining a first color-transformation matrix associated with the first image module and a second color-transformation matrix associated with the second image module, wherein the second color-transformation matrix is at least partially determined using the color-calibration offset.

8. The method defined in claim 6, further comprising:
   with the processing circuitry, collecting a first set of automatic white balance statistics associated with the first image and a second set of automatic white balance statistics associated with the second image.

9. The method defined in claim 8, further comprising:
   with the processing circuitry, determining a first color space associated with the first image using the first set of automatic white balance statistics; and
   with the processing circuitry, determining a second color space associated with the second image using the second set of automatic white balance statistics.

10. The method defined in claim 9, wherein the stereoscopic display has a display color space, the method further comprising:
    with the processing circuitry, transforming the first color space associated with the first image to the display color space using the first set of automatic white balance statistics and the first color-transformation matrix.

11. The method defined in claim 10, the method further comprising:
    with the processing circuitry, transforming the second color space associated with the second image to the display color space using the second set of automatic white balance statistics and the second color-transformation matrix.

12. A method of producing gain-matched, color-matched stereoscopic images using a stereoscopic imaging device wherein the stereoscopic imaging device comprises a stereoscopic display, processing circuitry, and a stereoscopic imager having a first image module and a second image module, the method comprising:
    with a calibration apparatus, determining a first color-calibration offset between the first image module and a gold standard image module; and
    with the calibration apparatus determining a second color-calibration offset between the second image module and the gold standard image module.

13. The method defined in claim 12, further comprising:
    capturing a first image with the first image module and a second image with the second image module, wherein the first image and the second image have a common overlapping portion.

14. The method defined in claim 13, further comprising:
with the processing circuitry, determining a first color-transformation matrix associated with the first image module, wherein the first color-transformation matrix is at least partially determined using the first color-calibration offset.

15. The method defined in claim 14, further comprising:
with the processing circuitry, determining a second color-transformation matrix associated with the second image module, wherein the second color-transformation matrix is at least partially determined using the second color-calibration offset.

16. The method defined in claim 15, wherein the stereoscopic display has a display color space, the method further comprising:
with the processing circuitry, determining a first color space associated with the first image and a second color space associated with the second image;
with the processing circuitry, transforming the first color space associated with the first image to the display color space using the first color-transformation matrix; and
with the processing circuitry, transforming the second color space associated with the second image to the display color space using the second color-transformation matrix.

17. The method defined in claim 16, wherein the second image has a mean intensity, the method further comprising:
with the processing circuitry, determining a total gain ratio between the first and second images; and
with the processing circuitry, adjusting the mean intensity based on the total gain ratio.

* * * * *